United States Patent
Kadi et al.

(10) Patent No.: US 6,718,260 B1
(45) Date of Patent: Apr. 6, 2004

(54) RECONFIGURABLE MENU DISPLAY FOR A VEHICLE NAVIGATION SYSTEM

(75) Inventors: Abdul-Majeed Kadi, West Bloomfield, MI (US); Nabil M Issa, Novi, MI (US); David J Pietras, Macomb, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/355,568

(22) Filed: Jan. 31, 2003

(51) Int. Cl.$^7$ .......................... H03M 7/40; G01C 21/00
(52) U.S. Cl. ................... 701/200; 701/211; 73/178 R; 340/995.12; 340/995.14
(58) Field of Search ............................... 701/200, 211, 701/213; 73/178 R; 340/995.1, 995.11, 995.12, 995.14

(56) References Cited

U.S. PATENT DOCUMENTS 5,459,667 A * 10/1995 Odagaki et al. ............ 701/209
5,850,193 A * 12/1998 Shimoura et al. ........ 340/995.1
6,359,571 B1 * 3/2002 Endo et al. ................. 340/988
6,385,542 B1   5/2002 Millington

* cited by examiner

*Primary Examiner*—William A. Cuchlinski, Jr.
*Assistant Examiner*—Olga Hernandez
(74) *Attorney, Agent, or Firm*—Edwin W. Bacon, Jr.

(57) ABSTRACT

A vehicle navigation system for a motor vehicle comprises a display screen and an input device. A menu having a plurality of menu items is displayable on the display screen and the menu items are selectable by the input device. The menu has a first configuration when the motor vehicle is stationary, has a second configuration when the motor vehicle is moving, and has the first configuration when the motor vehicle is moving but a passenger occupies the motor vehicle. When the menu is in the first configuration, all of the menu items are selectable by the input device. When the menu is in the second configuration, none or only a portion of the menu items are selectable by the input device.

10 Claims, 3 Drawing Sheets

RECONFIGURABLE MENU DISPLAY FOR A VEHICLE NAVIGATION SYSTEM

FIELD OF THE INVENTION

The present invention relates to vehicle navigation systems and more particularly to a reconfigurable menu display for vehicle navigation systems.

BACKGROUND OF THE INVENTION

The typical vehicle navigation system, in addition to displaying a digitized map and recommending a route for the operator of the motor vehicle to follow, also provides for storage and retrieval of various items of information. For example, vehicle navigation systems can contain address books, phone books, destination lists, and other customizable items. This information is typically shown on a display screen of the vehicle navigation system and arranged in a hierarchal menu format. Access to these various items of information is provided through buttons, switches, knobs, and other input devices located on a faceplate of the vehicle navigation system. As menu items are selected, the vehicle navigation system updates the display to present the desired information.

As the amount of information stored within vehicle navigation systems increases, the operator of the motor vehicle must spend a greater amount of time focusing his or her attention on the display of the vehicle navigation system. This increased level of distraction can be undesirable when the operator is driving the motor vehicle. For example, the Society of Automotive Engineers recommends that an operator of a motor vehicle be distracted no longer than fifteen seconds on instrument panel controls. However, there are situations where it is desirable to have full menu access when the motor vehicle is being driven, for example when there is a passenger present who can operate the vehicle navigation system for the operator of the motor vehicle.

SUMMARY OF THE INVENTION

A vehicle navigation system for a motor vehicle, is provided comprising a display screen and an input device. A menu having a plurality of menu items is displayable on the display screen. Each of the menu items is selectable by the input device. A wheel speed sensor and a passenger occupancy sensor are in communication with the vehicle navigation system. The menu has a first configuration when wheel speed sensor communicates to the vehicle navigation system that the motor vehicle is stationary. The menu has a second configuration when the wheel speed sensor communicates to the vehicle navigation system that the motor vehicle is moving. The menu has the first configuration when the wheel speed sensor communicates that the motor vehicle is moving but the passenger occupancy sensor communicates to the vehicle navigation system that a passenger occupies the motor vehicle. When the menu is in the first configuration, all of the menu items are selectable by the input device. When the menu is in the second configuration, none or only a portion of the menu items are selectable by the input device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
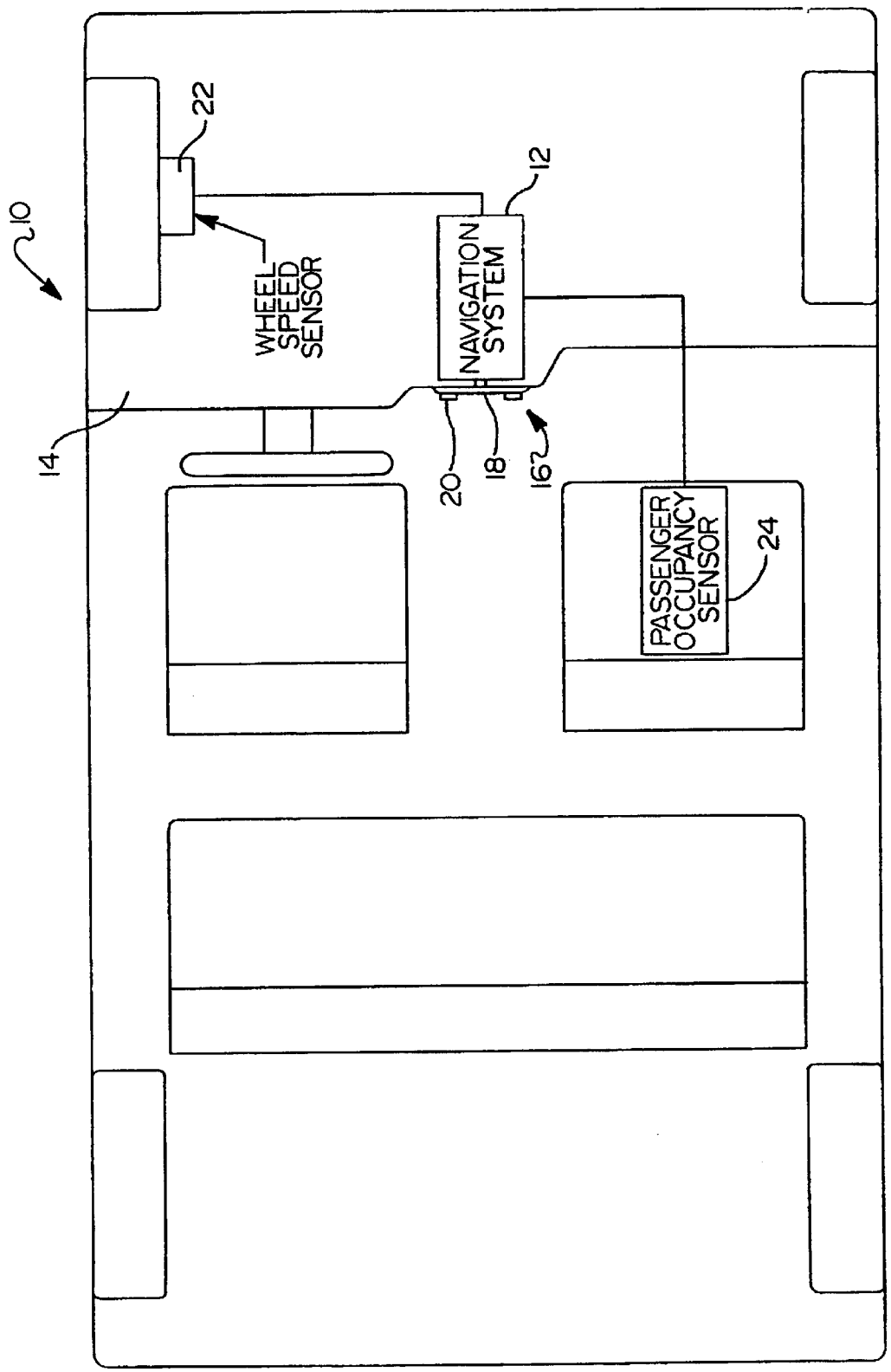
FIG. 1 is a schematic view of a motor vehicle with a vehicle navigation system according to the principles of the present invention.

Referring now to FIG. 1, there is shown a schematic diagram of a motor vehicle 10 having a vehicle navigation system 12 mounted within an instrument panel 14. The vehicle navigation system 12 is viewable by both the operator and a passenger of the motor vehicle 10. The vehicle navigation system 12 includes a faceplate 16 having a display 18 and a plurality of input devices 20. The plurality of input devices 20 control the vehicle navigation system 12 and may take various configurations, for example depressible buttons or rotating knobs.

The vehicle navigation system 12 is in communication with a wheel speed sensor 22 that monitors whether the motor vehicle 10 is moving or whether it is stationary. The vehicle navigation system 12 is in further communication with a passenger occupancy sensor 24 that monitors whether a passenger is occupying the motor vehicle 10.

Figure 2:
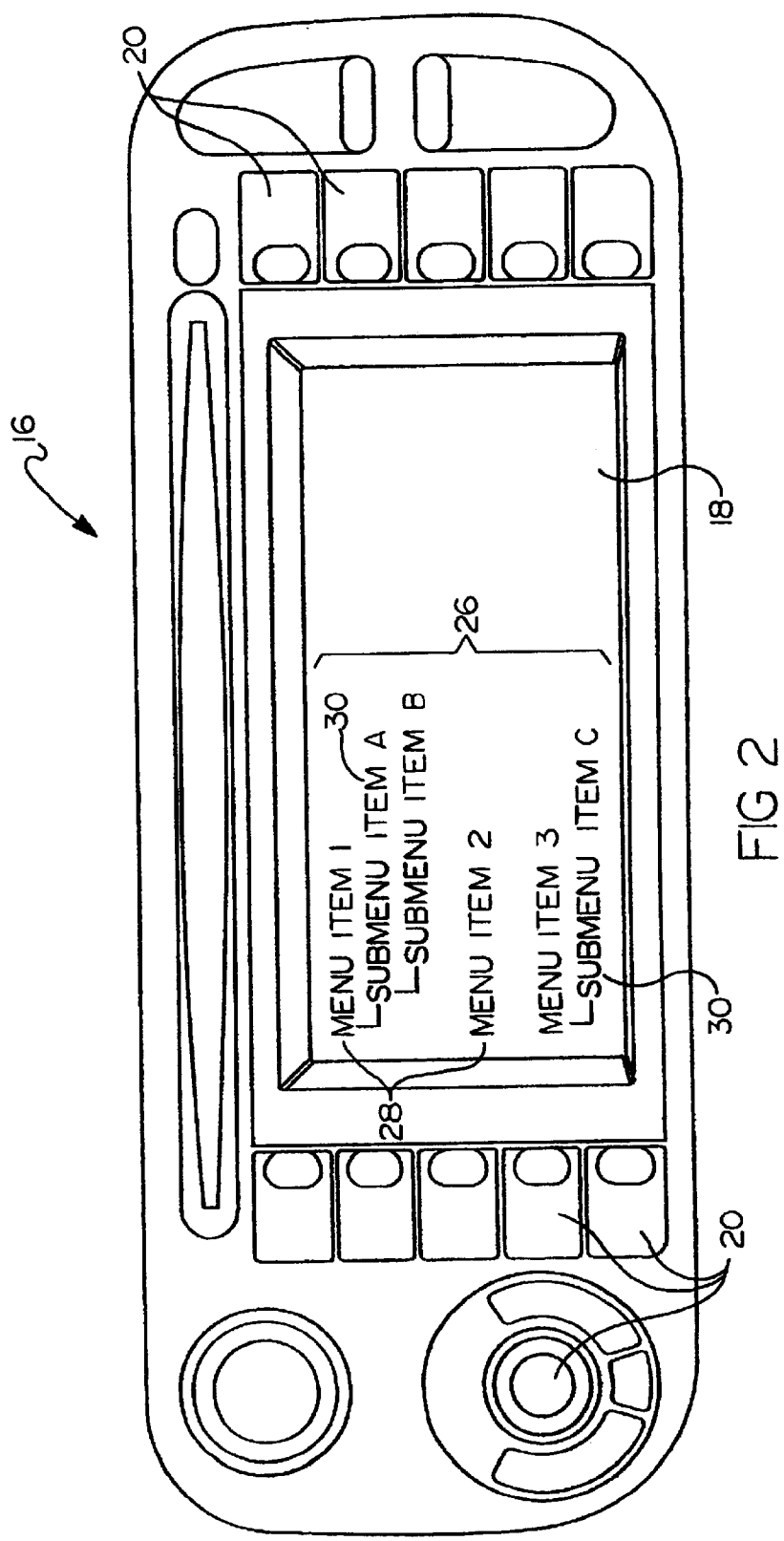
FIG. 2 is an illustration of a faceplate of the vehicle navigation system having a menu in a first configuration according to the principles of the present invention.

Referring now to FIG. 2, the faceplate 16 of the vehicle navigation system 12 is shown to include the display 18 and the plurality of input devices 20. The design of the faceplate 16 shown in FIG. 2 is used only for illustration purposes and is not intended to be limited to the particular example provided.

The display 18 includes a menu 26 having a first configuration containing a plurality of menu items 28. The menu items 28 are all individually selectable by the operator or the passenger of the motor vehicle 10 through the plurality of input devices 20. The menu items 28 include those items relevant to any vehicle navigation system. For example, the menu items 28 may include a points of interest item, an address book item, a phone book item, an intersection destination item, or an add/edit destination item. The menu items 28 each may have submenu items 30, either shown on the display 18 with the menu items 28, or shown separately on the display 18 once one of the menu items 28 have been selected.

Figure 3:
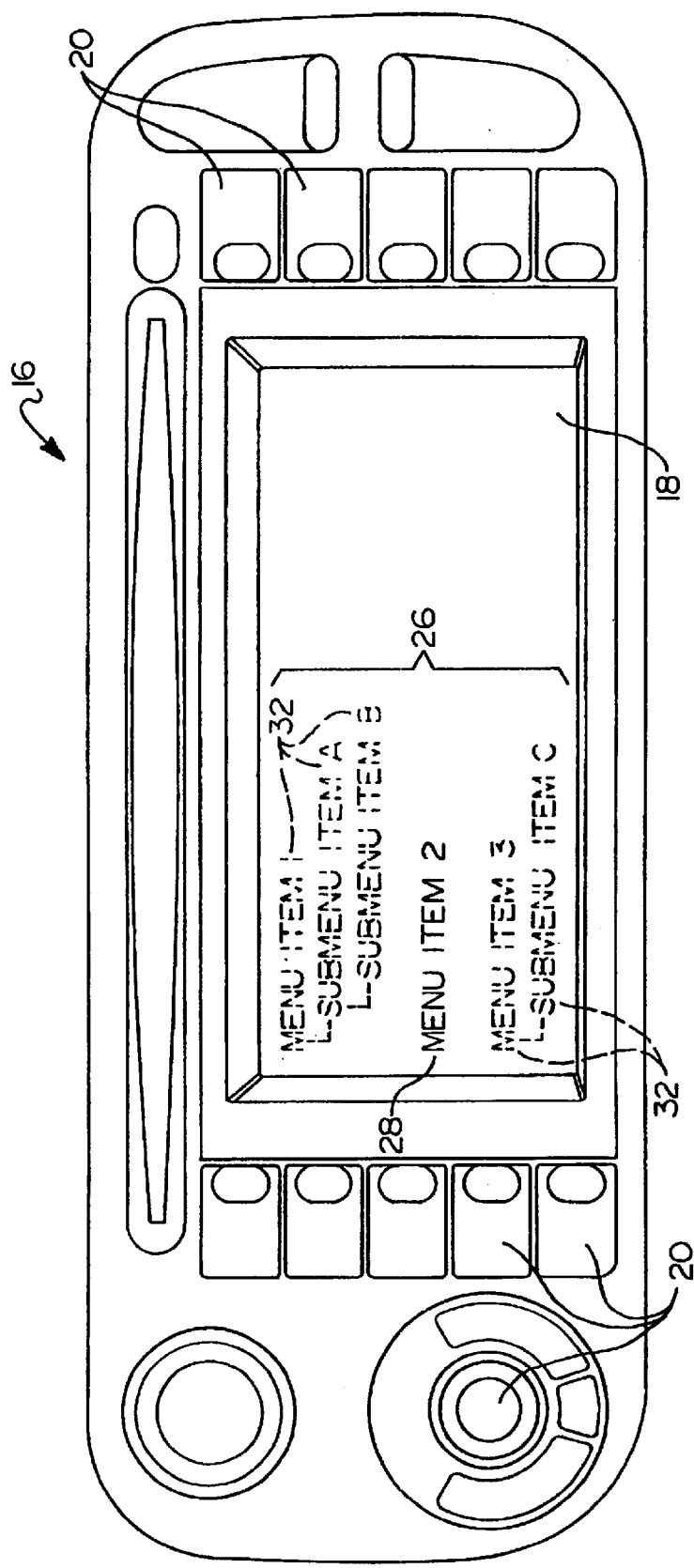
FIG. 3 is an illustration of a faceplate of the vehicle navigation system having a menu in a second configuration according to the principles of the present invention.

Referring now to FIG. 3, the display 18 shows the menu 26 having a second configuration containing the plurality of menu items 28. In the second configuration, only a portion of the menu items 28 in FIG. 2 are individually selectable by the operator of the motor vehicle 10 through the plurality of input devices 20. The second configuration also contains a plurality of unselectable menu items 32, shown shaded in FIG. 3, that are not individually selectable by the operator of the motor vehicle 10 through the plurality of input devices 20. Which menu items 28 are enabled and which are disabled in the second configuration can be preprogrammed into the vehicle navigation system 12 before, during, or after assembly of the motor vehicle 10. The particular arrangement of menu items 28 and unselectable menu items 39 provided in FIG. 3 is for illustration purposes only and is not intended to limit the possible configurations.

When the vehicle navigation system 12 is in use, the wheel speed sensor 22 informs the vehicle navigation system 12 whether the motor vehicle 10 is stationary or whether it is in motion. When the motor vehicle 10 is stationary, the menu 26 is in the first configuration, as seen in FIG. 2. When the motor vehicle 10 is in motion the vehicle navigation system 12 switches the menu 26 to the second configuration, as shown in FIG. 3, thereby disabling all or a portion of the menu items 28 and switching them to the unselectable menu items 32. However, if the passenger occupancy sensor 24 detects a passenger present in the motor vehicle 10, the vehicle navigation system 12 either keeps the menu 26 in the first configuration if the motor vehicle 10 is stationary, or switches the menu 26 from the second configuration to the first configuration if the motor vehicle 10 is in motion.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle comprising:
   a vehicle navigation system having a menu displayable on a display screen and selectable by an input device, said menu having a first configuration and a second configuration;
   a wheel speed sensor for determining when the motor vehicle is in motion, said wheel speed sensor in communication with said vehicle navigation system;
   a passenger sensor for determining when a passenger is present in the motor vehicle, said passenger sensor in communication with said vehicle navigation system;
   said menu of said navigation system operating in said first configuration when said wheel speed sensor communicates to said vehicle navigation system that the motor vehicle is stationary;
   said menu of said navigation system operating in said second configuration when said wheel speed sensor communicates to said vehicle navigation system that the motor vehicle is moving and said passenger occupancy sensor communicates to said vehicle navigation system that no passenger is present; and
   said menu of said navigation system operating in said first configuration when said passenger occupancy sensor communicates to said vehicle navigation system that a passenger is present.

2. The motor vehicle of claim 1, wherein said menu is comprised of a plurality of menu items selectable by said input device.

3. The motor vehicle of claim 2, wherein said plurality of menu items includes a points of interest item.

4. The motor vehicle of claim 2, wherein said plurality of menu items includes an address book item.

5. The motor vehicle of claim 2, wherein said plurality of menu items includes a phone book item.

6. The motor vehicle of claim 2, wherein said plurality of menu items includes an intersection destination item.

7. The motor vehicle of claim 2, wherein said plurality of menu items includes an add/edit destination item.

8. The motor vehicle of claim 2, wherein all of said plurality of menu items in said menu are selectable by said input device when said menu is in said first configuration.

9. The motor vehicle of claim 2, wherein a portion of said plurality of menu items in said menu are selectable by said input device when said menu is in said second configuration.

10. The motor vehicle of claim 2, wherein none of said plurality of menu items in said menu are selectable by said input device when said menu is in said configuration.

* * * * *